United States Patent [19]

Takei

[11] Patent Number: 5,298,297
[45] Date of Patent: Mar. 29, 1994

[54] LIQUID CRYSTAL DISPLAY DEVICE
[75] Inventor: Manabu Takei, Fussa, Japan
[73] Assignee: Casio Computer Co., Ltd., Tokyo, Japan
[21] Appl. No.: 984,245
[22] Filed: Nov. 30, 1992

Related U.S. Application Data

[63] Continuation of Ser. No. 634,083, Dec. 26, 1990, abandoned.

[30] Foreign Application Priority Data

Dec. 28, 1989 [JP] Japan .................................. 1-343601

[51] Int. Cl.$^5$ .......................................... G02F 1/1337
[52] U.S. Cl. ........................................ 428/1; 359/75; 359/78
[58] Field of Search ................... 428/1; 359/77, 78, 75

[56] References Cited

U.S. PATENT DOCUMENTS 4,735,492 4/1988 Sekine et al. .............................. 428/1
4,939,003 7/1990 Aoki et al. ................................. 428/1

Primary Examiner—Alexander S. Thomas
Attorney, Agent, or Firm—Frishauf, Holtz, Goodman & Woodward

[57] ABSTRACT

A liquid crystal display device of the present invention includes a first substrate having a plurality of first electrodes formed thereon, a second substrate having at east one second electrode opposed to at least one of the plurality of first electrodes, an aligning film covering at least one of combinations, one combination of which being consisted of the surfaces of the first electrodes and at least one portion of a surface of the first substrate and the other combination of which being consisted of the surface of the second electrode and at least one portion of a surface of the second substrate, a sealing member for bonding the first and second substrates with a predetermined gap therebetween so that surfaces of the first and second substrates on which the first and second electrodes are formed respectively are opposed to each other, and a liquid crystal material sealed in a space area encircled by the first and second substrates disposed in an opposing fashion and the sealing member. The aligning film is formed of a polymer film having a surface energy value higher than 47 dyn/cm.

12 Claims, 3 Drawing Sheets

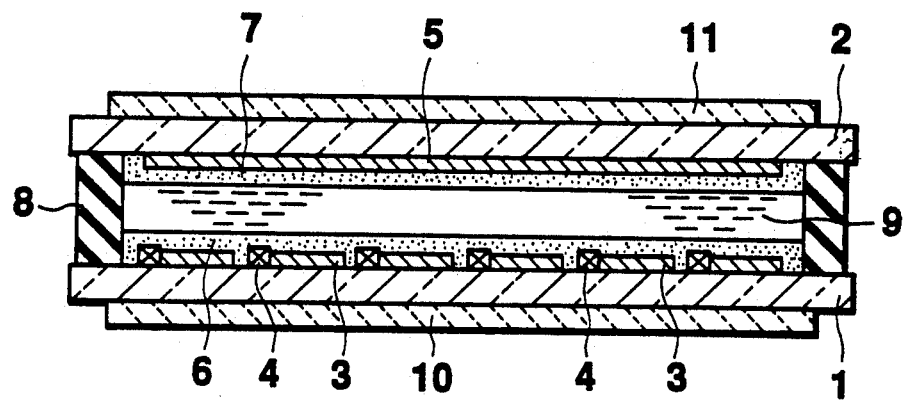
FIG.1
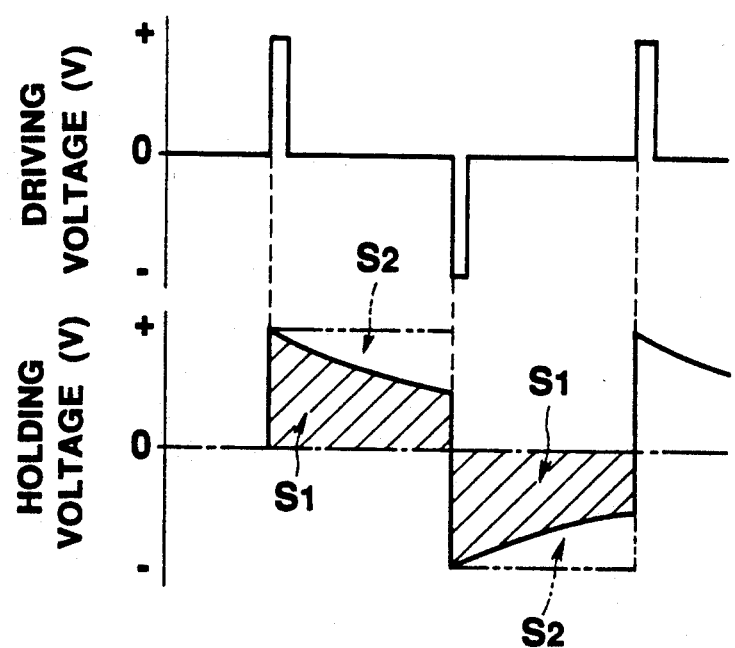
FIG.3A
FIG.3B

LIQUID CRYSTAL DISPLAY DEVICE

This application is a continuation of application Ser. No. 07/634,083, filed Dec. 26, 1990, abandoned.

BACKGROUND OF THE INVENTION

1. Field of the Invention

This invention relates to a liquid crystal display device.

2. Description of the Related Art

Conventionally, liquid crystal display devices are widely used as display devices of a television set or other electrical and electronic appliances etc. These liquid crystal display devices are requested to have display characteristics in which a displayed picture is stable and reliability of operation is maintained highly over a long period of time. One of the factors to determine whether display characteristic is good or bad is resistivity $\rho$ of liquid crystal material. In a liquid crystal display device which uses a liquid crystal material having small resistivity $\rho$, a very small electric current flows between electrodes opposing to each other across a liquid crystal material layer, so that the liquid crystal material is considerably deteriorated, reliability of operation is very low and stability of displayed picture is poor.

Particularly, in a TFT liquid crystal display device in which a plurality of picture element electrodes corresponding to a plurality of picture elements are arranged on one of opposing surfaces of a pair of substrates opposing to each other across a liquid crystal layer in a matrix pattern, a TFT (thin film transistor) is connected to each of these picture element electrodes and a voltage for changing an optical transmission factor of each picture element is selectively supplied to each electrode by turning ON and OFF this TFT, the following disadvantages are unavoidable. That is, when a predetermined voltage as video image data is applied to one picture element electrode by turning the TFT ON to thereby accumulate charges, the accumulated charges leak out so that the potential of the picture element electrode is fluctuated, thus optical transmission factor of the fluctuated picture element corresponding to the picture element electrode being fluctuated. As a result, a flicker occurs in a picture displayed on the TFT liquid crystal display device and a stability of picture is poor.

In order to solve this problem, it is proposed that the conventional liquid crystal display device uses a liquid crystal material whose resistivity $\rho$ is large.

However, in order to obtain a liquid crystal material having large resistivity, impurities must be substantially prefectly removed from liquid crystal material by repeating a refine-process over and over, so that the liquid crystal material having large resistivity becomes very expensive. Accordingly, the conventional liquid crystal display device using the liquid crystal material having large resistivity is high in manufacturing cost. Further, impurities adhere to a cell container into which liquid crystal is sealed, and it is substantially impossible to remove such impurities. Consequently, even if the liquid crystal having large resistivity is sealed in the cell container, it is difficult to maintain the resistivity of the liquid crystal high.

Accordingly, it is an object of the present invention to provide a liquid crystal display device which can substantially eliminate the aforenoted shortcomings and disadvantages encountered with the prior art. More specifically, it is an object of the present invention to provide a liquid crystal display device in which display of high image quality can be stably performed even if a liquid crystal material having a relatively small resistivity $\rho$ is utilized, and reliability can be maintained over a long period of time.

SUMMARY OF THE INVENTION

In order to achieve the above described object, a liquid crystal display device of this invention comprises: a first substrate having a plurality of first electrodes formed thereon formed; a second substrate having at least one second electrode opposed to at least one of the plurality of first electrodes; an aligning film covering at least one of combinations, one combination of which being consisted of the surfaces of the first electrodes and at least one portion of a surface of the first substrate and the other combination of which being consisted of the surface of the second electrodes and at least one portion of a surface of the second substrate, and having surface energy which is higher than 47 dyn/cm; a sealing member for bonding the first and second substrates with a predetermined gap therebetween so that surfaces of the first and second substrates on which the first and second electrodes are formed respectively are opposed to each other; and a liquid crystal material sealed in a space area encircled by the first and second substrates disposed in an opposing fashion and the sealing member.

In the liquid display device of the present invention characterized by being constructed as described above, the aligning film is formed of a film having surface energy which is more than 47 dyn/cm. The aligning film having such large surface energy restrains ion impurities of the impurities contained in the liquid crystal on the surface thereof so that the movable ion in the liquid crystal is decreased. Therefore, in the liquid crystal display device of the present invention, even if the liquid crystal material having a relatively small resistivity $\rho$ is used, a flicker or the like can be avoided, and a reliability can be maintained highly over a long period of time.

Further, the surface energy is expressed by the sum of polar power component $\gamma^p$ and dispersion power component $\gamma^d$, and in the aligning film of the present invention, it is preferable that the polar power component $\gamma^p$ is more than 9 dyn/cm.

Furthermore, it is preferable that the aligning film is made of polymer material of polyimide group or polyamide group.

Particularly, when the liquid crystal display device of the present invention is applied to the aforenoted TFT liquid crystal display device, it is possible to remarkably suppress the occurrence of a flicker phenomenon which is peculiar to the TFT liquid crystal display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodi- FIG. 1 is a cross section schematically showing an embodiment of a liquid crystal display device according to the present invention;

FIG. 3A is a schematic voltage waveform diagram showing a waveform of a voltage applied to a picture element electrode when the TFT corresponding to the picture element electrode in the TFT liquid crystal display device is turned ON;

FIG. 3B is a schematic voltage waveform diagram showing the change of voltage in the picture element electrode when the voltage having a waveform shown in FIG. 3A is applied to the picture element electrode, and being used to explain a definition of voltage holding rate;

DETAILED DESCRIPTION OF THE PREFERRED EMBODIMENT

An embodiment of the present invention will hereinafter be described with reference to the accompanying drawings.

Figure 2:
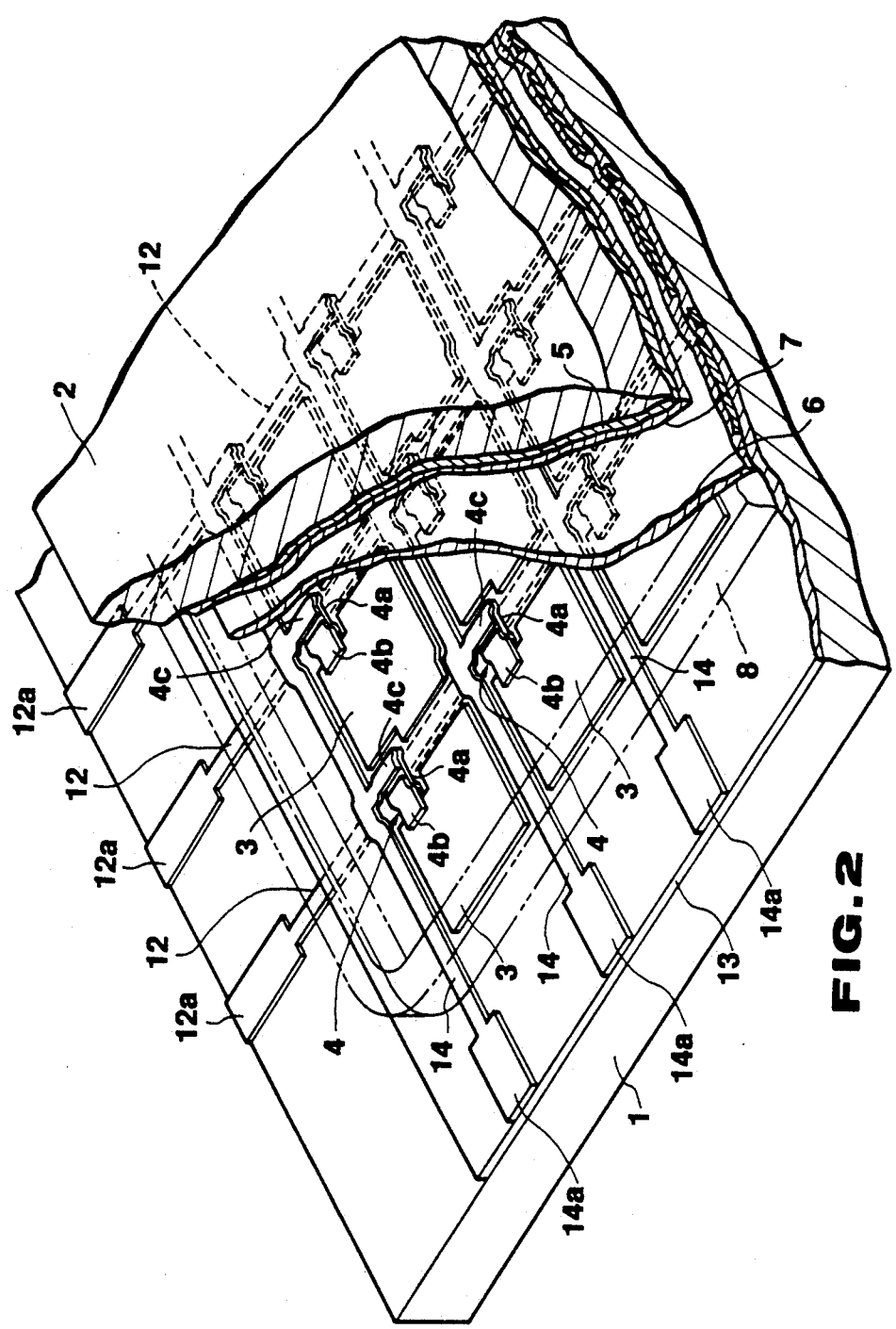
FIG. 2 is a schematic perspective view showing the liquid crystal display device shown in FIG. 1 with a part of which being cutted.

FIGS. 1 and 2 are cross-sectional view and perspective view of the TFT liquid crystal display device according to one embodiment, respectively.

In FIG. 1, reference numerals 1 and 2 designate a pair of transparent substrates made of glass or the like. On an upper surface of one substrate 1, a number of transparent picture element electrodes 3 made of Indium-Tin-Oxide (ITO) or the like and thin film transistor (TFT) 4 connected to these picture element electrodes 3 are formed in a matrix fashion. On the lower surface of the other substrate 2, an opposing transparent electrode 5 made of ITO or the like is formed on the substantially entire surface of the display area thereof. On the surfaces of the picture element electrodes 3 and the opposing electrodes 5 and on the substantially entire of display areas of the electrode forming surfaces of the substrates 1 and 2 on which these electrodes are formed, aligning films 6 and 7 made of polymer aligning film material are formed. The surfaces of these aligning films 6 and 7 are treated by a rubbing-process in predetermined directions, respectively. The two substrates 1 and 2 are bonded together by a frame-shaped sealing member 8 with the electrode forming surfaces thereof being opposed to each other. A liquid crystal material 9 is sealed in a space surrounded by the two substrates 1 and 2 and the frame-shaped sealing member 8. Polarizing plates 10 and 11 are disposed on outer surfaces of the two substrates 1 and 2 which are bonded together.

The TFT 4 connected to the each picture element electrode 3 is a three-terminal transistor which is formed by sequentially laminating predetermined thin films on the insulating substrate as shown in FIG. 2. These TFTs 4 are disposed on the upper surface of the substrate 1 as shown in FIG. 2. More specifically, a plurality of control lines 12 extending in the row direction of the matrix are formed between a plurality of picture element electrodes 3 formed in a matrix shape on the substrate 1. The control lines 12 are covered with an insulating film 13 formed as a gate insulating film on the substantially entire surface of the substrate 1 except the portions of control terminals 12a of the control lines 12. Each TFT 4 uses one portion of each control line 12 as a gate electrode, and a semiconductor film 4a is formed on one portion of each control line 12. One portion of the semiconductor film 4a and the picture element electrode 3 adjacent thereto are electrically connected to each other by a source electrode 4b formed to overlap the one portion of the semiconductor film 4a and the adjacent picture element electrode 3. A drain electrode 4c is formed on the other one portion of each semiconductor film 4a distant from the source electrode 4b by a predetermined distance as a channel portion so that the drain electrode 4c overlaps the other one portion and is electrically connected to the semiconductor film 4a. One portion of the control line 12, one portion of the insulating film 13, the semiconductor film 4a, the source electrode 4b and the drain electrode 4c which are mutually laminated constitute one thin film transistor. The drain electrodes 4c of a plurality of TFTs 4 located in a plurality of column directions of the picture element electrodes 3 arranged in a matrix fashion are connected to one another by a plurality of drain lines 14 formed on the insulating film 13 to extend in the row direction between the picture element electrodes 3. The drain lines 14 are extended to the edge of the substrate 1, and form data input terminals 14a at the extended ends on the edge of the substrate 1.

In the TFT liquid crystal display device, a control signal for sequentially turning ON a plurality of TFTs 4 at every row is supplied to the gate (control) lines 12, a data signal synchronized with this control signal is supplied from the data line through the drain source of the TFT to the picture element electrode and a common signal is supplied to the opposing electrode 5. Thus, the TFT liquid crystal display device is so controlled that a predetermined electric field is generated between the opposing electrode 5 and the selected picture element electrode 3, thus optical transmission factor in each of the picture elements arranged in a matrix fashion being selected arbitrarily.

In the liquid crystal display device of the present invention, at least one of the aligning films 6 and 7 formed on the opposing surfaces of the two substrates 1 and 2 is made of polymer material having surface energy of higher than 47 dyn/cm in various polymer materials such as polyimide group or polyamide group etc. In this invention, it is particularly preferable that surface energy value is higher than 50 dyn/cm. Further, it is also preferable that a polymer material is used in which polar power component $\gamma^p$ which expresses the surface energy by the sum of it and dispersion power component $\gamma^d$ is higher than 9 dyn/cm.

Here, polar power component $\gamma^p$ of surface energy and dispersion power component $\gamma^d$ thereof are calculated by a liquid-drop contact angle method. According to the liquid-drop contact angle method, several kinds of well known liquids whose polar power component $\gamma^p$ and dispersion power component $\gamma^d$ are known are dropped on the surface of the aligning film and contact angles $\theta$ of the surfaces of these dropped liquids relative to the surface of the aligning film are measured. Then, by the following equation, polar power component $\gamma s^p$ and dispersion power component $\gamma s^d$ of the surface energy of the aligning film are calculated according to the method of least squares.

$$\frac{1 + \cos\theta}{2} = \frac{1}{\sqrt{\gamma L^p + \gamma L^d}} (\sqrt{\gamma s^P \cdot \gamma L^P} + \sqrt{\gamma S^d \cdot \gamma L^d})$$

$\gamma S^p$; polar power component of surface energy of aligning film $\gamma S^d$; dispersion power component of surface energy of aligning film $\gamma L^p$; polar power component of surface energy of dropped liquid $\gamma L^d$; dispersion power component of surface energy of dropped liquid In the aligning films 6 and 7 made of the polymer material whose surface energy is large, movable ion is restrained on the surfaces of the aligning films 6 and 7 so that impurity ion in the liquid crystal material is also restrained on the surfaces of the aligning films 6 and 7. Therefore, the amount of the movable ion in the liquid crystal material is substantially decreased. As a result, the liquid crystal material 9 acts as a liquid crystal material having a large resistivity $\rho$. Accordingly, even if the liquid crystal composition whose resistivity $\rho$ is relatively low is employed as the liquid crystal material 9, a reliability of the liquid crystal display device can be prevented from being deteriorated.

In the TFT liquid crystal display device, the movable ion is restrained on the surfaces of the aligning films 6 and 7 so that the charges accumulated between the opposing electrode 5 and the picture element electrodes 3 can be prevented from being leaked therebetween. Therefore, the occurrence of flicker on the display can be avoided and the display characteristic can be improved. The flicker is evaluated by a voltage holding rate expressed by a ratio between the charges accumulated between the opposing electrode 5 and the picture element electrodes 3 during the period in which these electrodes are selected and charges accumulated in these electrodes at the end of one scan. In this embodiment, even if the liquid crystal material whose resistivity $\rho$ is relatively low is used, the above-mentioned voltage holding rate becomes higher than 80%. Further, if the liquid crystal material 9 having high resistivity $\rho$ is used, it is possible to obtain a liquid crystal display device having higher voltage holding rate.

The above-mentioned voltage holding rate is a degree of the change of the holding voltage between the picture element electrode 3 and the opposing electrode 5 in FIG. 3B which shows the change of voltage held in one picture element electrode when a drive voltage having a waveform shown in FIG. 3A is applied to the data line 14. More particularly, the voltage holding rate is a ratio [voltage holding rate=$(S_1/S_2) \times 100$] between an area $S_1$ of a slanted square waveform hatched in FIG. 3B and an area $S_2$ of a regular square waveform surrounded by two-dot chain line to enclose the area $S_1$ in FIG. 3B.

The surface energy of the above-mentioned aligning films 6 and 7 depends upon the chemical structure of polymer material which is the material of that film, a film forming temperature and a film forming process such as a heat treatment temperature etc. By way of example, a polyimide-group polymer film is formed by selecting one of the following amines I and II and one of carboxylic acid anhydride III and IV and by polymerizing the same.

I. p-phenylenediamine
II. 4,4'-diaminodiphenylmethane
III. cyclopentane tetracarboxylic acid anhydrate
IV. 1,2,3,4-cyclobutane tetracarboxylic acid anhydrate In the polyimide polymer aligning film formed by polymerizing amine of I and carboxylic acid anhydrate of IV, the polar power element $\gamma^p$ of the surface energy is considerably as large as 15 dyn/cm, and the value of the surface energy of the sum of the polar power component and dispersion power component $\gamma^d$ is as large as 50 dyn/cm. Further, in the polyimide polymer aligning film formed by polymerizing amine of II and carboxylic acid anhydrate of III, polar power component $\gamma^p$ of the surface energy is 9 dyn/cm which corresponds to an aligning film material A which will be described later.

Now, it will be described that the relationships between the voltage holding rates and the surface energies of the aligning films in the TFT liquid crystal display devices using the aligning films formed of various kinds of polymer materials.

Figure 4:
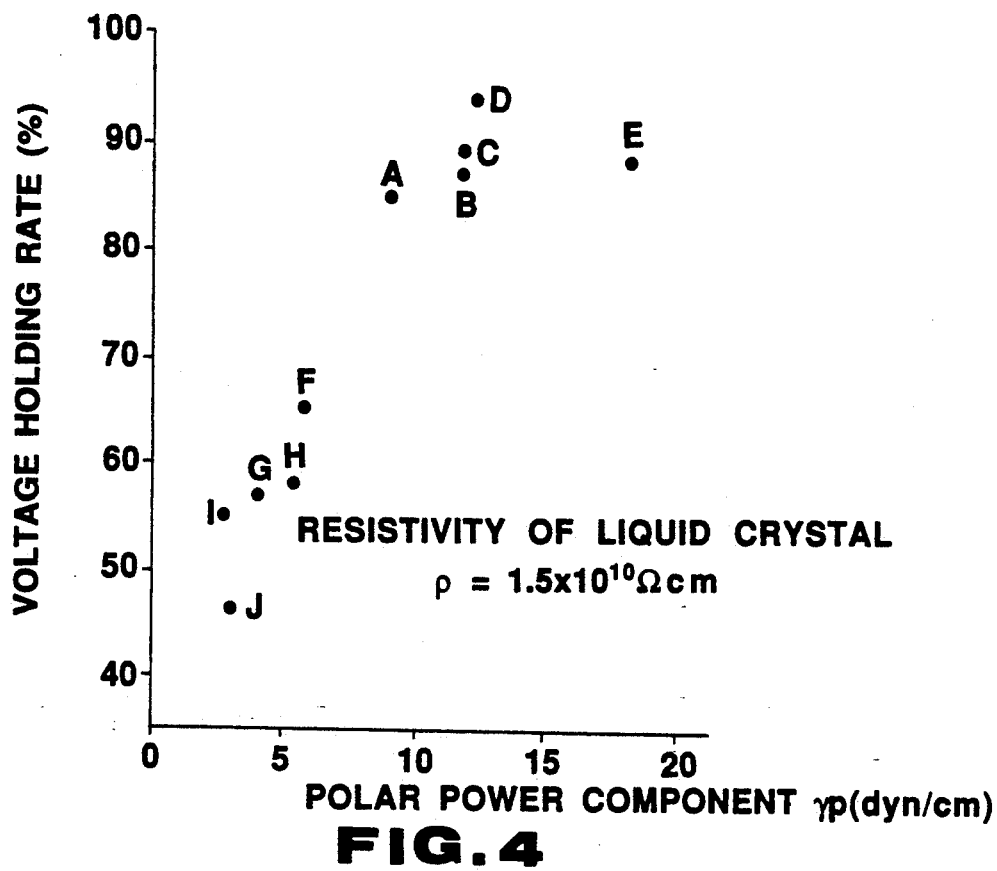
FIG. 4 is a schematic graph showing a relationship of the voltage holding rate relative to polar power element of surface energy of an aligning film in the liquid crystal display device of the present invention.
Figure 5:
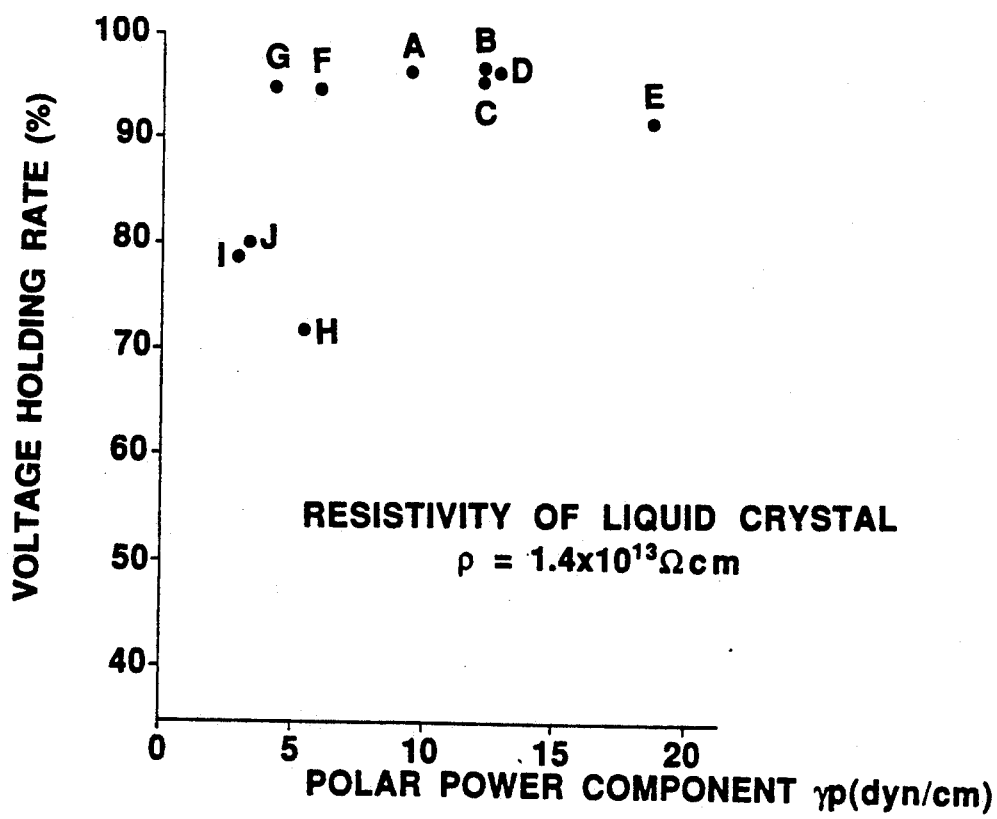
FIG. 5 is a schematic graph showing a relationship of the voltage holding rate relative to polar power element of surface energy of the aligning film when the liquid crystal display device uses a liquid crystal material different from the liquid crystal material used to form the graph of FIG. 4.

FIGS. 4 and 5 shows a relationship between polar power components $\gamma^p$ (dyn/cm) of surface energies of various kinds of aligning film materials A to J and voltage holding rates of the TFT liquid crystal display devices having aligning films formed of these aligning film materials. FIG. 4 shows a voltage holding rate of the liquid crystal display device in which resistivity $\rho$ of the liquid crystal is $1.4 \times 10^{13}$ $\Omega$cm, while FIG. 5 shows a voltage holding rate of the liquid crystal display device in which resistivity $\rho$ of the liquid crystal is $1.5 \times 10^{10}$ $\Omega$cm. The liquid crystals used in these two liquid crystal display devices are the same liquid crystal material but are different in containing amount of impurities. As is clear from FIGS. 4 and 5, in the liquid crystal display devices in which the aligning films are formed of the aligning film materials F, G, H, I and J having polar power component $\gamma^p$ of the surface energy smaller than about 9 dyn/cm, if the resistivity $\rho$ of the liquid crystal is as larger as $1.4 \times 10^{13}$ $\Omega$cm, the voltage holding rate is excellent, while if the resistivity $\rho$ of the liquid crystal is as small as $1.5 \times 10^{10}$ $\Omega$cm, the voltage holding rate becomes extremely poor. On the other hand, in the liquid crystal display devices in which the aligning films are formed of the aligning film materials A, B, C, D and E having the polar power component $\gamma^p$ of the surface energy higher than about 9 dyn/cm, if the resistivity $\rho$ of the liquid crystal is as large as $1.4 \times 10^{13}$ $\Omega$cm, the voltage holding rate is excellent, while if the resistivity $\rho$ of the liquid crystal is as small as $1.5 \times 10^{10}$ $\Omega$cm, the voltage holding rate is lowered by a very small amount. Therefore, the voltage holding rate can be made sufficiently high regardless of the resistivity of the liquid crystal.

In the respective aligning film materials A, B, C, D and E, the aligning film material A has the polar power component $\gamma^p$ of the surface energy being about 9 dyn/cm. Further, the aligning film materials B, C, D and E are all polymer aligning film materials of polyimide group etc., and due to the difference of chemical structures and due to the difference of the film forming processes during the aligning films are made, various values of polar power components $\gamma^p$ can be obtained.

In the above-mentioned liquid crystal display device, if the aligning films 6 and 7 are formed of the polymer aligning film materials having the polar power component $\gamma^p$ of the surface energy higher than about 9 dyn/cm, the voltage holding rate can be made sufficiently high regardless of the resistivity of the liquid crystal 9. Therefore, according to the liquid crystal display device of the present invention, even if the liquid crystal material having small resistivity is used, it is possible to obtain a stable display of high image quality in which a flicker or the like can be avoided. Further, the liquid crystal, which is produced by less refining-processes and has small resistivity, is inexpensive. In the liquid crystal display device as described above, the inexpensive liquid crystal material having small resistivity can be utilized so that the manufacturing cost can be reduced. Furthermore, the liquid crystal can be less affected by the impurity ion adhered to the cell container into which the liquid crystal is sealed, and the liquid crystal display device can be manufactured with ease.

The present invention is not limited to a liquid crystal display device of TFT active matrix type and may be applied to a liquid crystal display device of simple matrix type.

In addition, in order to achieve objects and attain effects of the present invention, it is clear the above-mentioned aligning film having large surface energy is formed on at least one of surfaces of the opposing substrates.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A liquid crystal display device comprising:
    a first substrate having a plurality of first electrodes formed thereon;
    a second substrate having at least one second electrode opposed to at least one of the plurality of first electrodes;
    an aligning film covering at least one of first and second regions said first region including a portion of surfaces of the first electrodes and a portion of a surface of said first substrate and said second region including a portion of a surface of the second electrode and a portion of a surface of said second substrate, and said aligning film having surface energy higher than 47 dyn/cm;
    a sealing member formed along peripheries of said first and second substrates to surround substantially said first and second regions, and bonding said first and second substrates with said substrates opposing each other and with a predetermined gap between said substrates, so that surfaces of said first and second substrates on which the first and second electrodes are formed respectively are opposed to each other; and
    a liquid crystal material sealed in an area between said opposed first and second substrates and encircled by said sealing member, said liquid crystal material being a liquid crystal composition whose resistivity is equal to or larger than $1.5 \times 10^{10}$ $\Omega$-cm.

2. A liquid crystal display device according to claim 1, wherein said aligning film is formed of a dielectric film having a polar power component of a surface energy higher than 9 dyn/cm.

3. A liquid crystal display device according to claim 2, wherein said dielectric film is formed of an organic polymer film which has an imide bond in its skeleton structure.

4. A liquid crystal display device according to claim 3, wherein said aligning film is formed of a polyimide-group polymer film which is made by polymerizing p-phenylenediamine, 1,2,3,4-cyclobutane tetracarboxylic acid and anhydrate.

5. A liquid crystal display device according to claim 3, wherein said aligning film is formed of a polyimide-group polymer which is made by polymerizing 4,4'-diaminodiphenylmethan and cyclopentane tetracarboxylic acid anhydrate.

6. A liquid crystal display device according to claim 1, wherein said aligning film is formed of an organic polymer film which has an imide bond in its skeleton structure.

7. A liquid crystal display device according to claim 1, wherein said liquid crystal material is a liquid crystal composition whose resistivity is equal to or smaller than $1.4 \times 10^{13}$ $\Omega$-cm.

8. A liquid crystal display device comprising:
    a first substrate;
    a second substrate disposed to oppose to said first substrate;
    a plurality of first electrodes formed on a surface of said first substrate in a matrix fashion;
    thin film transistors disposed on said first substrate to correspond to the plurality of said first electrodes, and connected to said first electrodes;
    data lines for mutually connecting a plurality of said thin film transistors which are arranged in row or column directions, and for applying a voltage to said first electrodes;
    control lines for mutually connecting a plurality of said thin film transistors which are arranged in column or row directions and for being supplied with a control signal which is used to control operations of said plurality of thin film transistors;
    a sealing member bonding said second substrate to said first substrate in a condition that said second substrate is disposed to oppose said plurality of first electrodes with a predetermined gap therebetween;
    at least one second electrode formed on a surface of said second substrate opposing said first substrate, and said at least one second electrode opposing said plurality of first electrodes;
    an aligning film covering at least one of first and second regions, said first region including a portion of surfaces of said first electrodes and a portion of a surface of said first substrate and said second region including a portion of a surface of said second electrode and a portion of a surface of said second substrate, and said aligning film having a surface energy higher than 47 dyn/cm; and
    a liquid crystal material sealed in a space between said opposed first and second substrates and encircled by said sealing member, said liquid crystal material is a liquid crystal composition whose resistivity is smaller than $1.4 \times [10^{23}]10^{13}$ $\Omega$-cm and higher than $1.5 \times [10^{13}]10^{10}$ $\Omega$-cm.

9. A liquid crystal display device according to claim 8, wherein said aligning film is formed of a dielectric film having a polar power component of a surface energy higher than 9 dyn/cm.

10. A liquid crystal display device according to claim 9, wherein said dielectric film is formed of an organic polymer film which has imide bond in its skeleton structure.

11. A liquid crystal display device according to claim 8, wherein said aligning film is formed of an organic polymer film which has an imide bond in its skeleton structure.

12. A liquid crystal display device according to claim 8, wherein said liquid crystal material is a liquid crystal composition whose resistivity is equal to or smaller than $1.4 \times 10^{13}$ $\Omega$-cm.

* * * * *